US009071477B2

(12) United States Patent
Kang et al.

(10) Patent No.: US 9,071,477 B2
(45) Date of Patent: Jun. 30, 2015

(54) METHOD AND ASSOCIATED PROCESSING MODULE FOR INTERCONNECTION SYSTEM

(71) Applicants: GLOBAL UNICHIP CORPORATION, Hsinchu (TW); TAIWAN SEMICONDUCTOR MANUFACTURING CO., LTD., Hsin-Chu (TW)

(72) Inventors: Wen-Juh Kang, Tainan (TW); Chen-Yang Pan, Taipei (TW); Jung-Chi Huang, Changhua County (TW)

(73) Assignees: GLOBAL UNICHIP CORPORATION, Hsinchu (TW); TAIWAN SEMICONDUCTOR MANUFACTURING CO., LTD., Hsin-Chu (TW)

(*) Notice: Subject to any disclaimer, the term of this patent is extended or adjusted under 35 U.S.C. 154(b) by 0 days.

(21) Appl. No.: 14/049,793

(22) Filed: Oct. 9, 2013

(65) Prior Publication Data

US 2015/0098496 A1  Apr. 9, 2015

(51) Int. Cl.
*H04L 25/03* (2006.01)

(52) U.S. Cl.
CPC .... *H04L 25/03044* (2013.01); *H04L 25/03949* (2013.01); *H04L 2025/03611* (2013.01)

(58) Field of Classification Search
CPC .................. H04L 25/03044; H04L 25/03949; H04L 2025/03611; H04L 25/028; H04L 25/03343; H04L 25/061; H04L 25/0292; H04L 25/03057; H04L 25/4906; H04L 2025/03363; H04L 2025/03802; H04L 25/0282
See application file for complete search history.

(56) References Cited

U.S. PATENT DOCUMENTS

| | | | |
|---|---|---|---|
| 5,001,726 A | 3/1991 | Kawai et al. | |
| 5,333,147 A | 7/1994 | Nohara et al. | |
| 6,728,311 B1 | 4/2004 | Waschura et al. | |
| 7,190,752 B2 | 3/2007 | Shake et al. | |
| 7,421,018 B2 | 9/2008 | Anim-Appiah et al. | |
| 7,940,839 B2 * | 5/2011 | Lapointe et al. | 375/229 |
| 2003/0177438 A1 | 9/2003 | Waschura et al. | |
| 2004/0047409 A1 * | 3/2004 | Lee et al. | 375/232 |
| 2008/0056344 A1 * | 3/2008 | Hidaka | 375/232 |
| 2008/0192814 A1 * | 8/2008 | Hafed et al. | 375/224 |
| 2008/0232268 A1 * | 9/2008 | Kahrizi et al. | 370/252 |
| 2008/0260016 A1 | 10/2008 | Lapointe et al. | |
| 2009/0175326 A1 * | 7/2009 | Stojanovic et al. | 375/229 |
| 2010/0027611 A1 * | 2/2010 | Dai et al. | 375/233 |
| 2010/0054323 A1 | 3/2010 | Farjad-rad | |
| 2010/0142607 A1 * | 6/2010 | Kim et al. | 375/232 |
| 2010/0177816 A1 * | 7/2010 | Malipatil et al. | 375/233 |
| 2010/0329322 A1 * | 12/2010 | Mobin et al. | 375/231 |
| 2013/0142245 A1 * | 6/2013 | Sindalovsky et al. | 375/233 |
| 2014/0233627 A1 * | 8/2014 | Palmer | 375/231 |

* cited by examiner

Primary Examiner — Hirdepal Singh
(74) Attorney, Agent, or Firm — WPAT, PC; Justin King

(57) ABSTRACT

A method and associated processing module for an interconnection system, providing a pre-tap tuning directing and a post-tap tuning directing. The interconnection system includes a transmitter filter and a receiver equalizer; the transmitter filter performs filtering according to a pre-tap and a post-tap, and the receiver equalizer performs equalization according to an equalizer tap. The pre-tap tuning directing includes: forming an indicative pattern with a plurality of data samples and a transition sample from an equalized signal, comparing if the indicative pattern matches predetermined pattern(s), and accordingly directing whether the pre-tap is incremented/decremented. The post-tap tuning directing selects whether the post-tap is incremented/decremented according to a positive/negative sign of the equalizer tap.

17 Claims, 6 Drawing Sheets

METHOD AND ASSOCIATED PROCESSING MODULE FOR INTERCONNECTION SYSTEM

FIELD OF THE INVENTION

The present invention relates to a method and associated processing module for an interconnection system, and more particularly, to a method and associated processing module capable of directing tap tuning for transmitter de-emphasis filter based on pre-cursor and post-cursor of channel response.

BACKGROUND OF THE INVENTION

Electrical circuit (e.g., chip, die or integrated circuit, etc.) is one of the most essential hardware foundations of modern information society; different electrical circuits can be connected into an interconnection system by channel(s), so these electrical circuits can exchange signals (e.g., information, data, messages, commands and/or packages) to coordinate and cooperate with each other for implementing integrated macro functions. However, characteristics of channel will impact quality of signal exchange. Generally, channel is of low-pass nature, and therefore will suppress high-frequency portion of signal and cause signal distortion; for example, when an electrical circuit acts as a transmitter and transmits a signal of a square waveform to another electrical circuit which acts as a receiver, the receiver will receive a slowly rising and falling waveform, instead of a square waveform with sharp rising and falling edges. In the waveform received by the receiver, the slowly rising portion is referred to as a pre-cursor, the peak of slowly rising forms a main cursor, and the slowly falling portion after the peak is referred to as a post-cursor. Signal distortion will cause ISI (inter-symbol interference) and degrade quality of signal transmission, e.g., increase bit error rate.

To compensate impact of channel, transmitter and receiver are respectively equipped with filtering and equalization mechanisms. For example, the filtering mechanism of transmitter can include a FIR (finite impulse response) filter for de-emphasis; the equalization mechanism of receiver can include a CTLE (continuous time linear equalizer) and a DFE (decision feedback equalizer). When a transmitter intends to send a signal to a receiver, filter of the transmitter will filter the outgoing signal based on a plurality of filter taps, so the filtered signal can be driven to a channel; when the receiver receives the incoming signal from the channel, the receiver will equalize the received signal based on a plurality of equalizer taps, and then retrieve contents and/or other information (e.g., clock) from the equalized signal.

Filter taps of the transmitter filter define characteristics of filtering; to effectively compensate channel effect, filter taps need to actually reflect channel characteristics, e.g., pre-cursor and post-cursor due to channel. However, known prior art fails to fully consider complete channel characteristics when setting and tuning filter taps of transmitter filter.

SUMMARY OF THE INVENTION

An objective of the invention is providing a method for an interconnection system; the interconnection system includes a transmitter filter and a receiver equalizer. The transmitter filter is arranged to filter a first signal based on a pre-tap and a post-tap, and accordingly provide a second signal; the receiver equalizer is arranged to equalize the second signal based on an equalizer tap, and accordingly provide a third signal. For the pre-tap, the proposed method includes: performing a pattern comparison step for a plurality of times to provide a plurality of comparison results, performing a voting step for providing a voting result according to majority voting of the plurality of comparison results, accumulating a plurality of voting results to provide an accumulation result, and performing a pre-tap tuning directing step for directing whether the pre-tap is incremented or decremented according to the accumulation result, e.g., directing whether to increment the pre-tap according to if the accumulation result is greater than a threshold.

The pattern comparison step includes: forming an indicative pattern according to a plurality of data samples of the third signal and a transition sample of the third signal, comparing whether the indicative pattern matches one or more predetermined patterns, and accordingly providing a comparison result; wherein the transition sample is sampled between two of the plurality of data samples.

For the post-tap of the transmitter filter, the proposed method includes: performing a post-tap tuning directing step for directing whether the post-tap is incremented or decremented according to a sign of the equalizer tap; e.g., directing to increment the post-tap if the equalizer tap is greater than zero, and directing to decrement the post-tap if the equalizer tap is less than zero.

An objective of the invention is providing a processing module for an interconnection system, including a pre-tap tuning directing module and a post-tap tuning directing module. The pre-tap tuning directing module includes a plurality of comparators, a voting module and an accumulator. Each comparator is arranged to form an indicative pattern according to multiple data samples of the third signal and a transition sample of the third signal, compare whether the indicative pattern matches one or more predetermined patterns, and accordingly provide a comparison result, wherein the transition sample is sampled between two of the data samples. The voting module is coupled to the comparators and the accumulator, for providing a voting result according to majority voting of the plurality of comparison results of the comparators. The accumulator is arranged to accumulate a plurality of voting results and accordingly provide an accumulation result, so the pre-tap tuning directing module can direct whether to increment the pre-tap according to the accumulation result, e.g., according to if the accumulation result is greater than a threshold.

For the post-tap, the post-tap tuning directing module is arranged to direct whether the post-tap is incremented or decremented according to a sign of the equalizer tap, e.g., direct to increment the post-tap when the equalizer tap is greater than zero, and to decrement the post-tap when the equalizer tap is less than zero.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
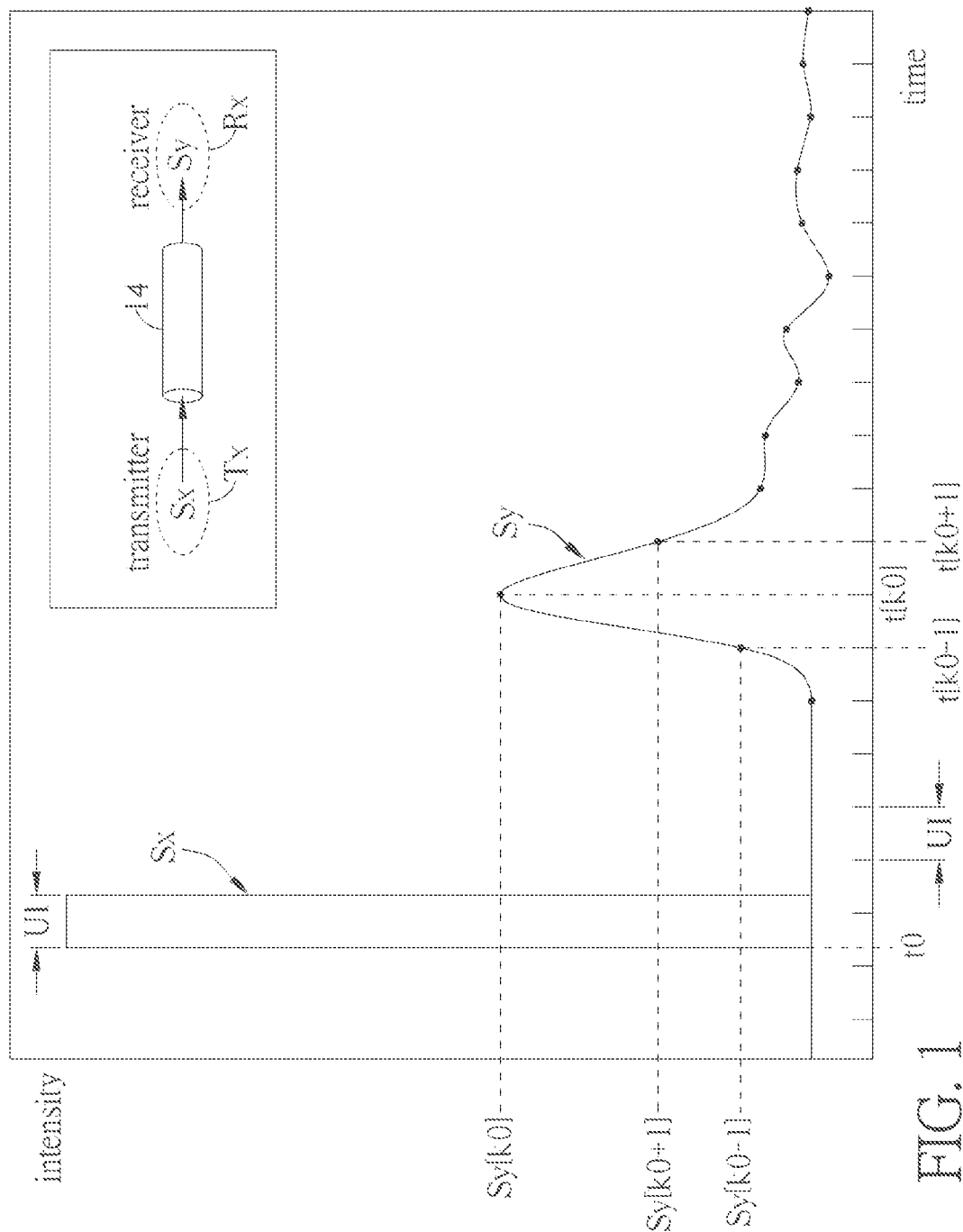
FIG. 1 exemplifies how channel of an interconnection system affects signal transmission.

Please refer to FIG. 1 exemplifying how channel impacts signal transmission. In FIG. 1, a transmitter Tx is connected to a receiver Rx via a channel 14, when the transmitter Tx intends to send a signal Sx to the receiver Rx, the signal Sx propagates through the channel 14 to form a signal Sy to be received by the receiver Rx. In the example of FIG. 1, the signal Sx carries a logic 1 symbol with a square wave staring at time t0 and lasting for an interval UI. Due to waveform distortion caused by the channel 14, the square wave in the signal Sx becomes a slowly rising and falling waveform in the signal Sy. As the receiver Rx samples the signal Sy, the logic 1 symbol corresponds to a peak sample Sy[k0] forming a main cursor at time t[k0]. Contrarily to the main cursor, in the signal Sy, what comes before time t[k0] forms pre-cursor, such as a sample Sy[k0−1] at time t[k0−1]; what comes after time t[k0] forms post-cursor, like a sample Sy[k0+1] at time t[k0+1]. The interval between every two consecutive times t[k0-1], t[k0] and t[k0+1] can equal the interval UI.

Figure 2:
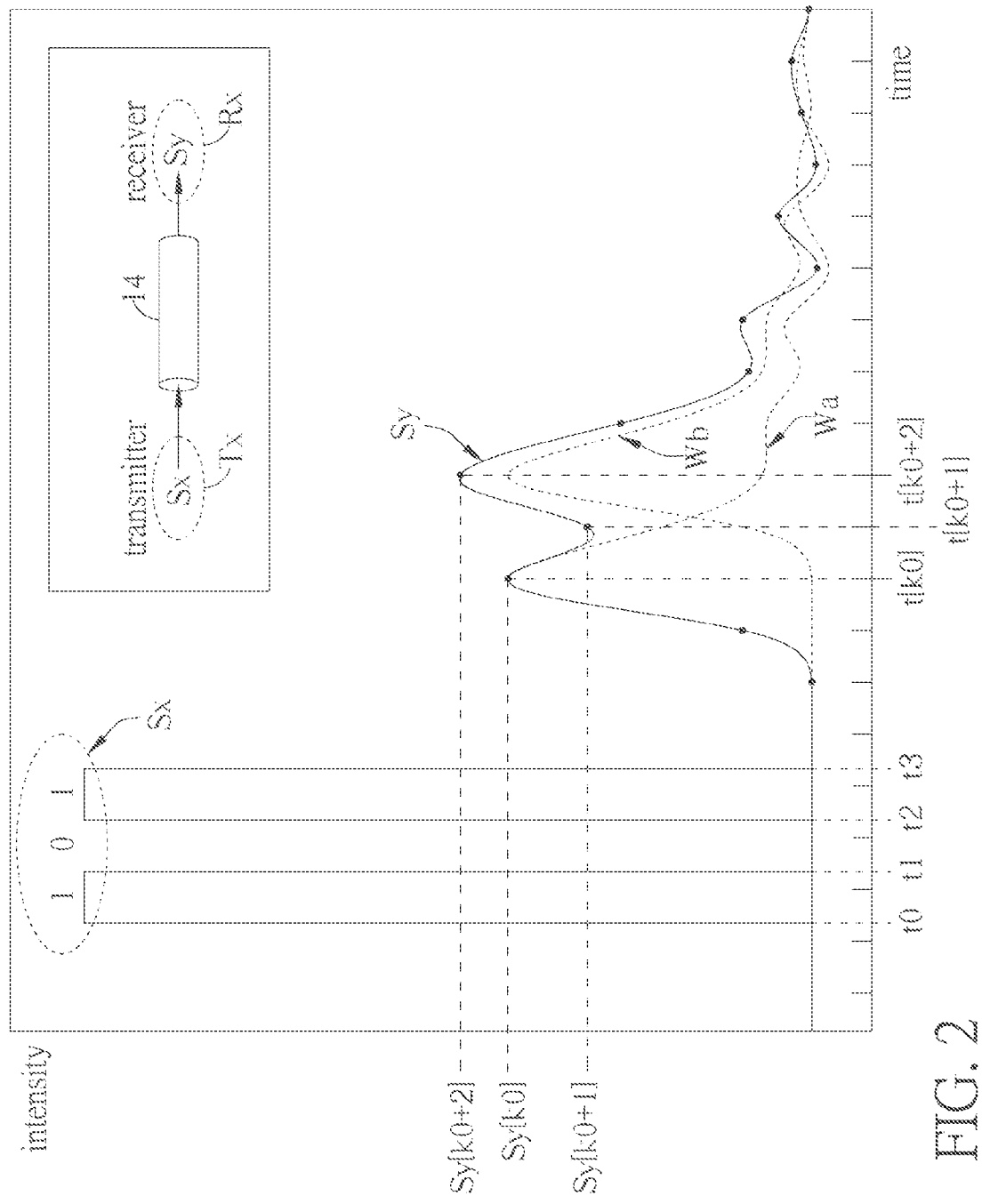
FIG. 2 exemplifies ISI.

Under an ideal circumstance, intensity of pre-cursor and post-cursor should equal zero, so only main cursor is left. Owing to non-ideal influence caused by channel characteristics, however, the signal Sy will suffer pre-cursor and post-cursor of certain intensity, and hence induce ISI. Following FIG. 1, please refer to FIG. 2 exemplifying ISI. In the example of FIG. 2, the signal Sx carries three consecutive symbols from time t0 to t3, respectively equal to logic 1, 0 and 1. Via propagation of the channel 14, the logic 1 square wave between time t0 to t1 forms a waveform Wa in the receiver Rx, the other logic 1 square wave between time t2 to t3 leads to a waveform Wb in the receiver Rx, so the signal Sy received by the receiver Rx is a combination of the waveforms Wa and Wb, and logic 1, 0, 1 in the signal Sx respectively correspond to samples Sy[k0], Sy[k0+1] and Sy[k0+2] of the signal Sy. As shown in FIG. 2, because post-cursor of the waveform Wa (what comes after time t[k0]) and pre-cursor of the waveform Wb (what comes before time t[k0+2]) sum up at time t[k0+1], so intensity of the sample Sy[k0+1] will not settle to zero, and hence the sample Sy[k0+1] originally representing logic 0 will be incorrectly determined to be logic 1 owing to ISI. According to discussion of FIG. 1 and FIG. 2, compensation of channel characteristics and suppression of ISI demand fully consideration covering influences of pre-cursor and post-cursor.

Figure 3:
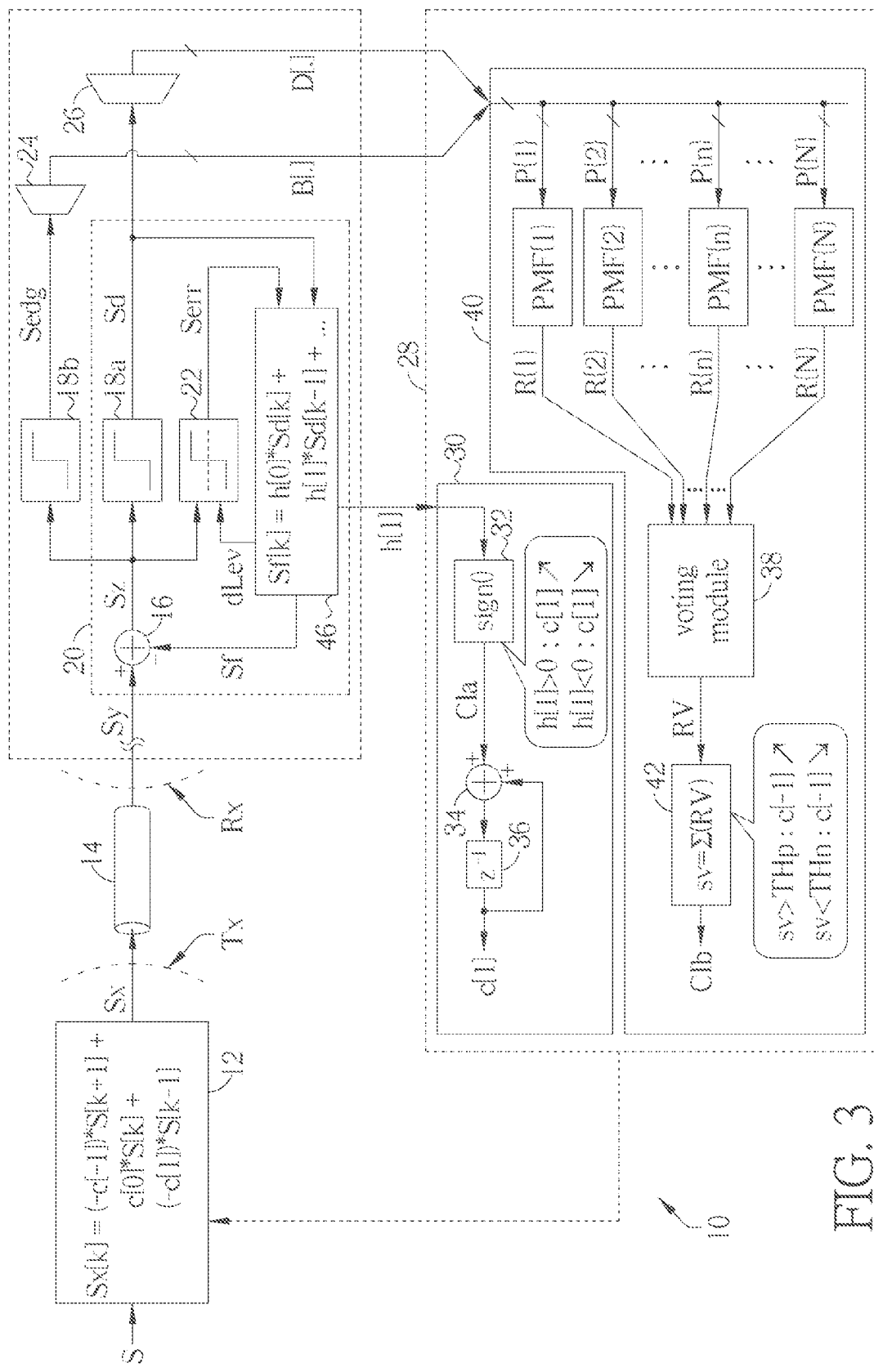
FIG. 3 illustrates an interconnection system according to an embodiment of the invention.

Please refer to FIG. 3 illustrating a processing module 28 for an interconnection system 10 according to an embodiment of the invention. The interconnection system 10 includes a transmitter Tx and a receiver Rx connected by a channel 14. The transmitter Tx includes a filter 12 (transmitter filter) coupled to the channel 14. The receiver Rx includes an adder 16, samplers 18a and 18b, a slicer 22, an equalization circuit 46 and two de-serializers 24 and 26. The processing module 28 includes two tuning directing modules 30 and 40, respectively as a post-tap tuning directing module and a pre-tap tuning directing module. The tuning directing module 30 can include a sign extractor 32, an adder 34 and a delayer 36. The tuning directing module 40 can include N comparators PMF{1}, PMF{2} ... to PMF{N}, a voting module 38 and an accumulator 42.

In the transmitter Tx, the filter 12 can be a FIR de-emphasis filter, such as a filter has at least three taps c[−1], c[0] and c[1], wherein the tap c[−1] can be referred to as a pre-tap, and the tap c[1] can be regarded as a post-tap. When the transmitter Tx is sending a signal S to the receiver Rx, the filter 12 filters the signal S based on the taps c[−1], c[0] and c[1] and accordingly provides a signal Sx. For example, the filter 12 can respective multiply the taps (−c[−1]), c[0] and (−c[1]) with samples S[k+1], S[k] and S[k−1] of the signal S, and sum the three multiplications to form a sample Sx[k] of the signal Sx.

The signal Sx transmitted by the transmitter Tx propagates via the channel 14, and is received as a signal Sy by the receiver Rx. For example, the signal Sy can be a signal equalized by a CTLE (not shown). The adder 16, the slicer 22, the sampler 18a and the equalization circuit 46 also form an equalizer 20 for further equalizing the signal Sy to provide a signal Sd, and contents of the signal Sd represent logic values determined from the signal Sy by the receiver Rx.

In the equalizer 20 (receiver equalizer), the adder 16 is coupled among the channel 14, the equalization circuit 46, the slicer 18a, 18b and the sampler 22, for subtracting a signal Sf from the signal Sy to form an equalized signal Sz. The sampler 18a is coupled to the signal Sz for sampling the signal Sz, determining logic values of samples, and accordingly forming the signal Sd; for example, the sampler 18a can compare whether each sample Sz[k] of the signal Sz is greater than a middle level; if true, the sampler 18a sets a sample Sd[k] of the signal Sd equal to logic 1, otherwise sets the sample Sd[k] equal to logic 0. The slicer 22 is also coupled to the signal Sz, for providing a signal Serr, i.e., a signed error signal, according to the signal Sz; for example, if a sample Sz[k] is determined to be logic 1, the slicer 22 can set a sample Serr[k] of the signal Serr equal to +1 or −1 to reflect whether the sample Sz[k] is greater or less than a level dLev.

In the equalizer 20, the equalization circuit 46 is coupled among the sampler 18a, the slicer 22 and the adder 16, for processing the signal Sd to provide the signal Sf based on a plurality of taps (equalizer taps) h[0], h[1] etc. For example, the equalizer circuit 46 can respectively multiply the taps h[0], h[1], . . . etc. with the samples Sd[k], Sd[k−1], . . . etc., and sum the multiplication results to provide a sample Sf[k] of the signal Sf. Because the tap h[1] and subsequent taps (e.g., taps h[2], h[3], . . . etc.) are utilized to compensate post-cursor of the signal Sy, they are referred to as post-taps of the equalizer 20; for example, the tap h[1] is the first post-tap of the equalizer 20. The equalizer 20 can dynamically, adaptively adjust each of the taps h[0], h[1], etc. according to the signals Serr and Sd, and also provide the level dLev to reflect an average level (intensity) of logic 1.

Figure 4:
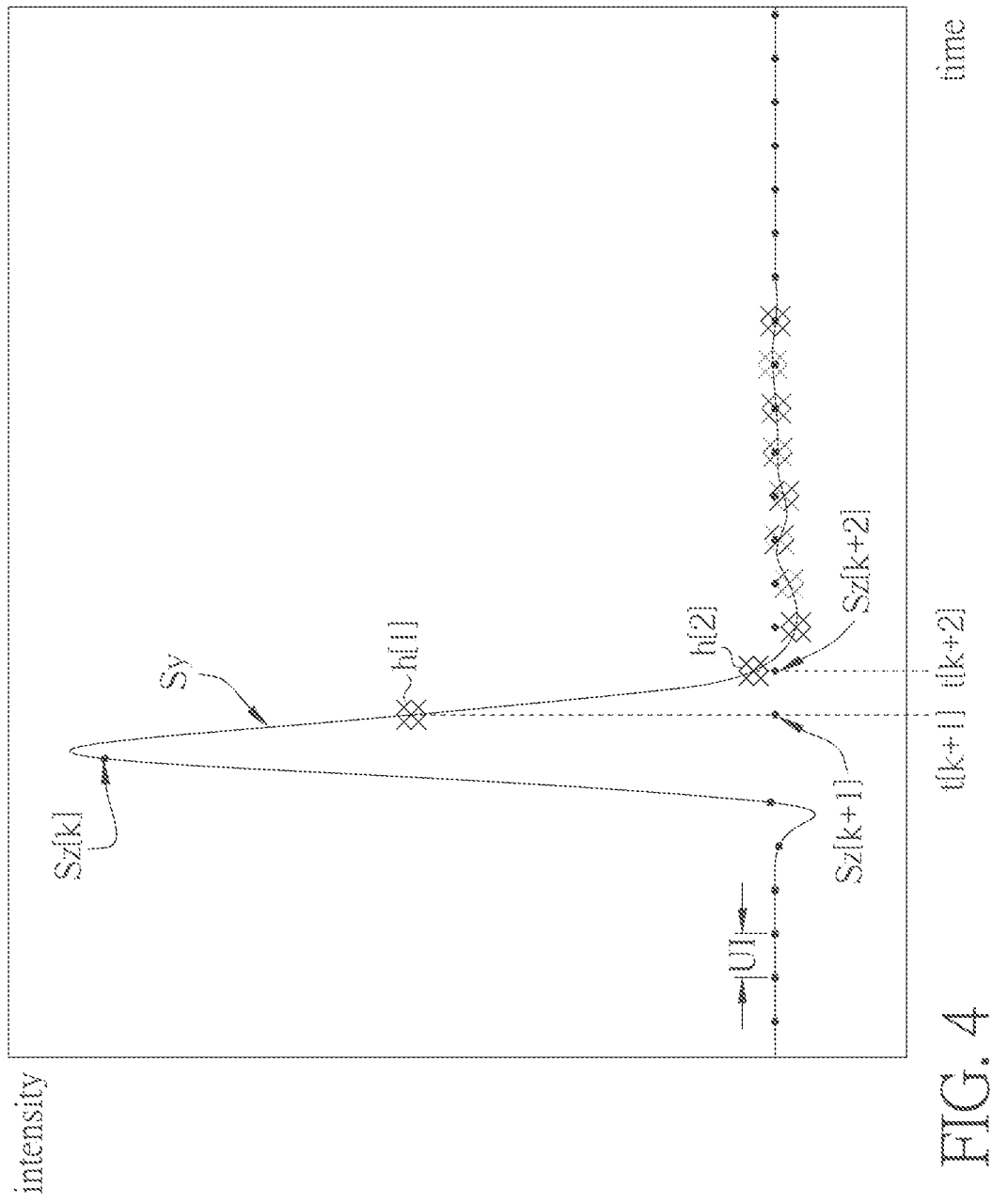
FIG. 4 exemplifies equalization of the receiver shown in FIG. 3.

The equalizer 20 can implement a decision feedback equalization mechanism, for suppressing influence of post-cursor from the signal Sy to form the signal Sz; this equalization mechanism can be exemplified by FIG. 4. As shown in FIG. 4, in response to a logic 1 symbol, the signal Sy exhibits a slowly rising and falling waveform, which can reflect logic 1 by a sample Sz[k] of the signal Sz, but still includes a post-cursor of finite intensity. By feedback equalization, however, post-cursor of the signal Sy can be annihilated, so the samples Sz[k] and Sz[k+1] corresponding to post-cursor can approach zero to suppress ISI. To annihilate post-cursor of the signal Sy, the equalizer 20 can cause each post-tap to track intensity of post-cursor of the signal Sy; for example, in the signal Sy, because intensity at time $t[k+1]$ is greater than that at time $t[k+2]$, the tap $h[1]$ is greater than the tap $h[2]$.

Please refer to FIG. 3 again. Since taps of the equalizer 20 can reflect intensity of post-cursor of channel response, the tuning directing module 30 is arranged to direct whether to increment the tap $c[1]$ of the filter 12 according to the tap $h[1]$ of the equalizer 20. In an embodiment of the invention, if the tap $h[1]$ is positive (greater than zero), the tuning directing module 30 can cause the tap $c[1]$ to be incremented, e.g., by one unit; if the tap $h[1]$ is negative (less than zero), the tuning directing module 30 can cause the tap $c[1]$ to be decremented, e.g., by one unit. In the tuning directing module 30, the sign extractor 32 is coupled to the tap $h[1]$ of the equalizer 20, for reflecting positive/negative sign of the tap $h[1]$ to a signal Cla, e.g., representing a positive tap $h[1]$ by $+1$ and a negative tap $h[1]$ by $-1$. The adder 34 and the delayer 36 form a loop for updating the tap $c[1]$ by incrementing or decrementing one unit respectively when the signal Cla equals $+1$ or $-1$.

Equivalently, the tuning directing module 30 performs a post-tap tuning directing step, including: according to the equalizer tap $h[1]$, directing whether the filter tap $c[1]$ of the transmitter Tx should be incremented or decremented, and reflecting tuning direction (increment or decrement) of the tap $c[1]$ by the signal Cla. In FIG. 3, the sign extractor 32 can be included in the receiver Rx, the adder 34 and the delayer 36 can be included in the transmitter Tx. Modern standard of circuit interconnection (e.g., PCI-Express) has included protocol for feedback from receiver to transmitter, so the receiver can feedback performance of signal receiving to the transmitter, and then the transmitter can accordingly improve signal transmitting, e.g., adjust tap(s) of the transmitter filter. In accordance, the signal Cla shown in FIG. 3 can be sent back to the transmitter Tx from the receiver Rx by the feedback protocol.

By post-tap tuning directing of the tuning directing module 30, the filter 12 of the transmitter Tx can cooperate with the equalizer 20 of the receiver Rx to annihilate residual signal of post-cursor. When the post-tap tuning directing mechanism causes the tap $c[1]$ of the filter 12 to increase, post-cursor intensity of the signal Sy will be weakened, and the tap $h[1]$ of the equalizer 20 can thus be lowered.

In another embodiment of the post-tap tuning directing module, the tuning directing module 30 causes the tap $c[1]$ to be adjusted according to sign of the tap $h[1]$ only when the tap $h[1]$ is greater than a predetermined value; when the tap $h[1]$ is less than the predetermined value, the tuning directing module 30 keeps the tap $c[1]$ of the filter 12 unchanged.

Figure 5:
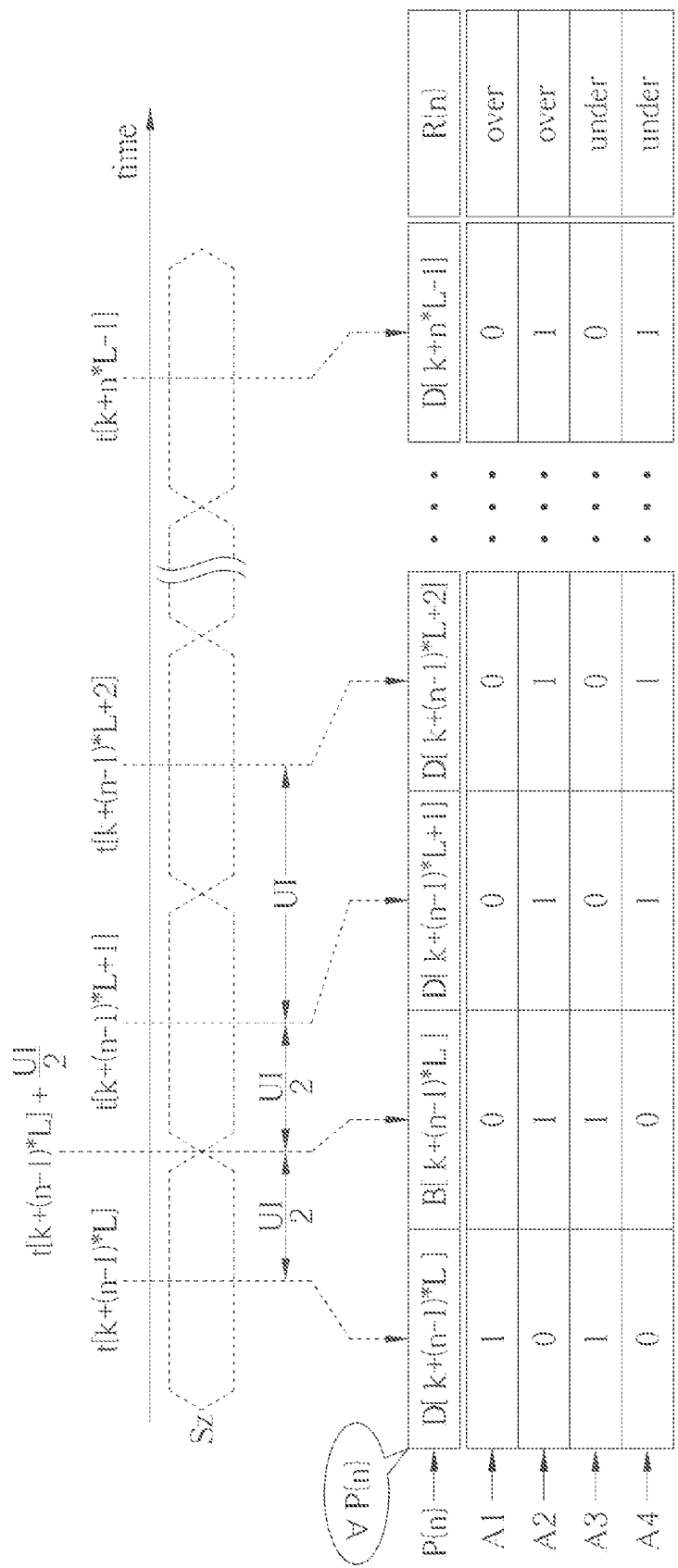
FIG. 5 illustrates operation of the comparator shown in FIG. 3.

To adjust another tap $c[-1]$ of the receiver filter 12, the tuning directing module 40 can perform pattern comparison on the equalized signal Sz to identify whether over-equalized patterns and under-equalized patterns appear in the signal Sz, and accordingly direct whether to increment the tap $c[-1]$. The tuning directing module 40 can be integrated in the receiver Rx. In view of FIG. 3, please refer to FIG. 5 illustrating how each of the comparators PMF{1} to PMF{N} work by taking a comparator PMF{n} (FIG. 3) as an example. In the receiver Rx, the sampler 18a can sample the signal Sz in response to a data clock (not shown), and output each sampled result (i.e., sample Sd[.]) to the signal Sd; on the other hand, the sampler 18b can sample the signal Sz according to a transition clock (not shown), and output sampled result to a signal Sedg. The data clock can be retrieved from the signal Sy, and the transition clock can be a clock 180 degrees behind the data clock. The de-serializer 26 is coupled to the signal Sd of the sampler 18a, for de-serializing sequential samples Sd[.] of the signal Sd to parallel data samples D[.]; the de-serializer 24 is coupled to the signal Sedg, for de-serializing sequential samples of the signal Sedg to parallel transition samples B[.]. According to the data samples D[.] and the transition samples B[.], patterns P{1} to P{N} are formed as indicative patterns. The comparators PMF{1} to PMF{N} are respectively coupled to the patterns P{1} to P{N}, each comparator PMF{n} is arranged to compare whether the pattern P{n} matches one of one or more predetermined patterns, and accordingly provide a comparison result R{n}. For example, there can be four predetermined patterns, such as the patterns A1 to A4 shown in FIG. 5.

As shown in FIG. 5, in the pattern P{n} provided to the comparator PMF{n}, L samples respectively sampled at time $t[k+(n-1)*L]$ to $t[k+n*L-1]$ become data samples $D[k+(n-1)*L]$ to $D[k+n*L-1]$ listed in the pattern P{n}; wherein any two consecutive times $t[m]$ and $t[m+1]$ are separated by the interval UI. The sampler 18b samples at time $(t[k+(n-1)*L]+UI/2)$ to provide a transition sample $B[k+(n-1)*L]$, which is arranged in the pattern P{n} between the data samples $D[k+(n-1)*L]$ and $D[k+(n-1)*L+1]$. That is, the transition sample $B[k+(n-1)*L]$ is sampled between two neighboring data samples $D[k+(n-1)*L]$ and $D[k+(n-1)*L+1]$. In an embodiment of the invention, the number N can equal 4, and the number L can equal 4.

In the embodiment of FIG. 5, contents of the predetermined pattern A1 are logic 1, 0, ..., 0; i.e., if the data sample $D[k+(n-1)*L]$ of the pattern P{n} equals logic 1, the transition sample $B[k+(n-1)*L]$ and the subsequent data samples $D[k+(n-1)*L+1]$ to $D[k+n*L-1]$ are all equal to logic 0, then the pattern P{n} matches the predetermined pattern A1, and the comparator PMF{n} can represent over-equalization (denoted as "over" in FIG. 5) by $+1$ in the comparison result R{n}. The predetermined pattern A2 can equal logic 0, 1, ..., 1; that is, if the data sample $D[k+(n-1)*L]$ of the pattern P{n} equals logic 0, the transition sample $B[k+(n-1)*L]$ and subsequent data samples $D[k+(n-1)*L+1]$ to $D[k+n*L-1]$ are all equal to logic 1, then the pattern P{n} matches the predetermined pattern A2, and the comparator PMF{n} can provide $+1$ to the comparison result R{n} to represent over-equalization.

On the other hand, as shown in FIG. 5, the predetermined pattern A3 can equal logic 1, 1, 0, ..., 0; and the predetermined pattern A4 can equal logic 0, 0, 1, ..., 1; these two patterns A3 and A4 both correspond to under-equalization. That is, in the pattern P{n}, if the data sample $D[k+(n-1)*L]$ and the transition sample $B[k+(n-1)*L]$ both equal logic 1, the subsequent data samples $D[k+(n-1)*L+1]$ to $D[k+n*L-1]$ are all equal to logic 0, then the pattern P{n} matches the predetermined pattern A3, and the comparator PMF{n} can reflect under-equalization (denoted as "under" in FIG. 5) by $-1$ in the comparison result R{n}. Similarly, in the pattern P{n}, if the data sample $D[k+(n-1)*L]$ and the transition sample $B[k+(n-1)*L]$ both equal logic 0, the subsequent data samples $D[k+(n-1)*L+1]$ to $D[k+n*L-1]$ are all equal to logic 1, then the pattern P{n} matches the predetermined pattern A4, and the comparator PMF{n} can reflect under-equalization by $-1$ in the comparison result R{n}. If the pattern P{n} does not match any of the predetermined patterns A1 to A4, then the comparator PMF{n} can reflect 0 in the comparison result R{n}. Generally, in the (L+1) samples (including L data samples and a transition sample between the first two data samples), if the last L samples are of the same logic value which is opposite to the logic value of the first sample, then the comparator PMF{n} can reflect over-equalization in the comparison result R{n}; if the last (L−1) samples are of the same logic value which is opposite to the logic value of the first two samples, then the comparison result R{n} reflects under-equalization.

Figure 6:
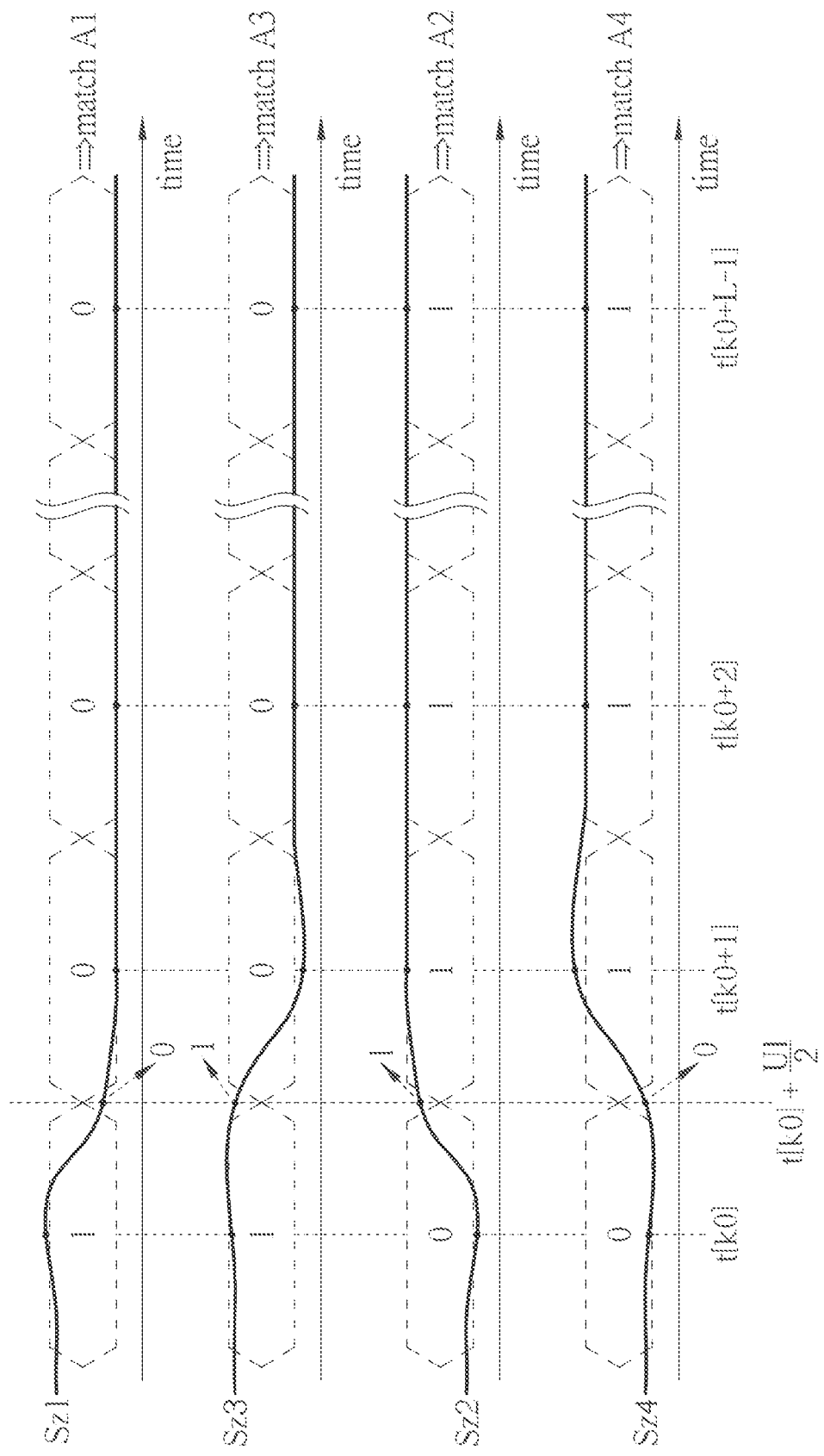
FIG. 6 exemplifies meaning of each predetermined pattern shown in FIG. 5.

Continuing FIG. 3 and FIG. 5, please refer to FIG. 6 exemplifying waveforms associated with the predetermined patterns. As shown in FIG. 6, assuming sequential L symbols of the signal Sz (FIG. 3) equal logic (1, 0, . . . , 0) respectively at times t[k0], t[k0+1] to t[k0+L−1], if the signal Sz is of the waveform Sz1, then a pattern formed during times t[k0], (t[k0]+UI/2), t[k0+1] to t[k0+L−1] will match the pattern A1, because the transition sample at time (t[k0]+UI/2) equals logic 0. When the waveform Sz1 transits from logic 1 at time t[k0] to subsequent (L−1) samples of logic 0 after time (t[k0]+1), if the signal Sz is over-equalized, the waveform Sz1 will quickly drop to logic 0 before the middle time (t[k0]+UI/2); that is, if the pattern of the signal Sz matches the pattern A1, it represents that the signal Sz is over-equalized.

Contrarily, when the L symbols at times t[k0], t[k0+1] to t[k0+L−1] of the signal Sz (FIG. 3) respectively equal logic (1, 0, . . . , 0), if the signal Sz shapes like the waveform Sz3, then the pattern formed during times t[k0], (t[k0]+UI/2), t[k0+1] to t[k0+L−1] will match the pattern A3, because the transition sample at time (t[k0]+UI/2) equals logic 1. When the waveform Sz3 transits from logic 1 at time t[k0] to subsequent (L−1) values of logic 0 after time (t[k0]+1), if the signal Sz is under-equalized, the waveform Sz3 will slowly fall to logic 0 after the middle time (t[k0]+UI/2). Consequently, if pattern of the signal Sz matches the pattern A3, the signal Sz is under-equalized.

Similarly, assuming the L symbols at times t[k0], t[k0+1] to t[k0+L−1] of the signal Sz (FIG. 3) respectively equal logic (0, 1, . . . , 1), if the signal Sz shapes respectively like the waveforms Sz2 and Sz4, then the pattern formed during times t[k0], (t[k0]+UI/2), t[k0+1] to t[k0+L−1] will respectively match the patterns A2 and A4, because the transition sample at time (t[k0]+UI/2) respectively equals logic 1 and 0. When the signal Sz transits from logic 0 at time t[k0] to subsequent values of logic 1 after time (t[k0]+1), if the signal Sz is over-equalized, it will rapidly rise to logic 1 before the middle time (t[k0]+UI/2), as shown by the waveform Sz2. Hence, if pattern of the signal Sz matches the pattern A2, then signal Sz is over-equalized. If the signal Sz is under-equalized, it will slowly rise to logic 1 after the middle time (t[k0]+UI/2), as shown by the waveform Sz4. That is, if pattern of the signal Sz matches the pattern A4, then signal Sz is under-equalized.

In other words, each comparator PMF{n} of the comparators PMF{1} to PMF{N} equivalently performs a pattern comparison step for detecting, by pattern comparison, how signal of the receiver is equalized, so the tap tuning directing module 40 can accordingly direct whether to increment the tap c[−1] of the transmitter. In the tap tuning directing module 40, the voting module 38 is coupled to the comparison results R{1} to R{N} of the comparators PMF{1} to PMF{N}, for performing a voting step to provide a voting result RV according to majority voting of the comparison results R{1} to R{N}. For example, among the comparison results R{1} to R{N}, assuming that there are a number N_over of comparison results reflecting over-equalization, a number N_under of comparison results reflecting under-equalization, and a number N_dntcare reflecting "not match any predetermined pattern", if the number N_over is the greatest of the three numbers, then the voting module 38 can reflect +1 in the voting result RV; if the number N_under is the greatest, then the voting module 38 reflects −1 in the voting result RV; and if the number N_dntcare is the greatest, the voting module 38 reflects in the voting result RV by 0.

Each comparator PMF{n} can iterate pattern comparison over the signal Sz; for example, the comparator PMF{n} can perform a comparison with transition and data samples at times t[k+(n−1)*L] to t[k+n*L−1], then perform another comparison with transition and data samples updated at times t[k+N*L+(n−1)*L] to t[k+N*L+n*L−1], and accordingly update the comparison result R{n}. When the comparators PMF{1} to PMF{N} update the comparison results R{1} to R{N}, the voting module 38 also performs another round of majority voting and accordingly update the voting result RV. In the tap tuning directing module 40, the accumulator 42 is coupled to the voting result RV of the voting module 38; as the voting module 38 updates the voting result RV, the accumulator 42 can accumulate each updated voting result RV and accordingly provide an accumulation result sv. According to the accumulation result sv, the tap tuning directing module 40 can direct whether to increment the tap c[−1]. For example, if the accumulation result sv is greater than a predetermined threshold THp, then the tap tuning directing module 40 can direct to increment the tap c[−1] using a signal Clb, so as to compensate over-equalization, e.g., to increment the tap c[−1] by one unit; if the accumulation result sv is less than another threshold THn, then the tap tuning directing module 40 can use the signal Clb to direct to decrement the tap c[−1] for compensating under-equalization, e.g., to decrement the tap c[−1] by one unit. When the accumulation result sv exceeds the thresholds THp or THn and thus the tap c[−1] is incremented or decremented, the accumulation result sv can be reset to 0 and be accumulated by subsequent voting result RV all over again. Similar to the signal Cla, the signal Clb can be fed back to the transmitter Tx from the receiver Rx by the feedback protocol from receiver to transmitter.

In the tap tuning module 40, the voting module 38 implements low-pass filtering on comparison results of the comparators, such that tuning of the tap c[−1] is not affected by instantaneous noise. For example, even though the filter tap setting of the transmitter Tx leads to signal over-equalization, sudden noise in signal may still cause some of the comparison results to reflect under-equalization. However, because the voting module 38 performs majority voting over the comparison results R{1} to R{N}, minority of incorrect comparison results R{.} will not impact the voting result RV. Similarly, operation of the accumulator 42 and arrangement of the thresholds THn, THp also implement low-pass filtering; because the tap tuning directing module 40 directs whether to increment tap c[−1] according to long term accumulation of the voting result RV, impact on filter tap tuning owing to instantaneous error can be suppressed.

To sum up, comparing to prior art, the invention observes post-cursor and pre-cursor of channel response by post-cursor equalizer tap and patterns in received signal waveform, and accordingly tuning pre-tap and post-tap of transmitter filter. Therefore, transmitter filter tap tuning of the invention can actually reflect complete characteristics of channel response. In addition, hardware complexity of the invention is lower, so as to be implemented by lower cost and resources, and to be broadly adopted by high-speed, high-frequency interconnection systems. For example, each comparator R{n} in FIG. 3 can be implemented by simple table look-up circuit; also, operation of the tap tuning directing modules 30 and 40 only involves extraction of positive/negative sign, value comparison and simple adding, rather than multi-bit analog to digital conversion and complicated arithmetic multiplication.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for an interconnection system, the interconnection system comprising a transmitter filter and a receiver equalizer, the transmitter filter arranged to filter a first signal based on a pre-tap and a post-tap, and accordingly provide a second signals; the receiver equalizer arranged to equalize the second signal based on an equalizer tap and accordingly provide a third signal, and the method comprising:
   performing, by a hardware processor a pattern comparison step for forming an indicative pattern according to a plurality of data samples of the third signal and a transition sample of the third signal, comparing if the indicative pattern matches a predetermined pattern, and accordingly providing a comparison result, wherein the transition sample is sampled between two of the plurality of data samples; and
   performing a pre-tap tuning directing step for, according to the comparison result, directing whether the pre-tap is incremented or decremented; and
   performing a post-tap tuning directing step for, according to a sign of the equalizer tap, directing whether the post-tap is incremented or decremented.

2. The method of claim 1, wherein the post-tap tuning directing step directs to increment the post-tap if the equalizer tap is greater than zero, and decrement the post-tap if the equalizer tap is less than zero.

3. The method of claim 1, wherein comparing the indicative pattern during the pattern comparison step is to compare if the indicative pattern matches one of a plurality of predetermined patterns.

4. The method of claim 1 further comprising:
   performing the pattern comparison step for a plurality of times to provide a plurality of corresponding comparison results;
   wherein the pre-tap tuning directing step is performed for directing whether the pre-tap is incremented or decremented according to the plurality of comparison results.

5. The method of claim 4 further comprising:
   performing a voting step for proving a voting result according to majority voting of the plurality of comparison results; and
   accumulating a plurality of voting results to provide an accumulation result;
   wherein the pre-tap tuning directing step is performed for directing whether the pre-tap is incremented or decremented according to the accumulation result.

6. The method of claim 5, wherein the pre-tap tuning directing step is performed for directing whether the pre-tap is incremented or decremented according to if the accumulation result is greater than a threshold.

7. A processing module for an interconnection system, the interconnection system comprising a transmitter filter and a receiver equalizer, the transmitter filter arranged to filter a first signal based a pre-tap and a post-tap, and accordingly provide a second signal; the receiver equalizer arranged to equalize the second signal based on an equalizer tap and accordingly provide a third signal; the processing module comprising:
   a pre-tap tuning directing module, and
   a post-tap tuning directing module arranged to direct whether the post-tap is incremented or decremented according to a sign of the equalizer tap; and
   the pre-tap tuning directing module comprising:
   a predetermined number of comparators, each of the comparators being a hardware arranged to form an indicative pattern according to a plurality of data samples of the third signal and a transition sample of the third signal, compare if the indicative pattern matches a predetermined pattern, and accordingly provide a comparison result, wherein the transition sample is sampled between two of the plurality of data samples;
   wherein the pre-tap tuning directing module is arranged to direct whether the pre-tap is incremented or decremented according to the comparison results of the predetermined number of comparators.

8. The processing module of claim 7, wherein the post-tap tuning directing module directs to increment the post-tap if the equalizer tap is greater than zero, and decrement the post-tap if the equalizer tap is less than zero.

9. The processing module of claim 7, wherein each of the predetermined number of comparators is arranged to compare whether the indicative pattern matches one of a plurality of predetermined patterns.

10. The processing module of claim 7 comprising a plurality of the comparators to provide a plurality of the comparison results, and the pre-tap tuning directing module directs whether the pre-tap is incremented or decremented according to the plurality of comparison results.

11. The processing module of claim 10, wherein the pre-tap tuning directing module further comprises:
   a voting module for providing a voting result according to majority voting of the comparison results; and
   an accumulator for accumulating a plurality of voting results and accordingly providing an accumulation result;
   wherein the pre-tap tuning directing module directs whether the pre-tap is incremented or decremented according to the accumulation result.

12. The processing module of claim 11, wherein the pre-tap tuning directing module directs whether the pre-tap is incremented or decremented according to if the accumulation result is greater than a threshold.

13. A method for an interconnection system, the interconnection system comprising a transmitter filter and a receiver equalizer, the transmitter filter arranged to filter a first signal based on a pre-tap and accordingly provide a second signal, the receiver equalizer arranged to equalize the second signal and accordingly provide a third signal, and the method comprising:
   performing, by a hardware processor a pattern comparison step for forming an indicative pattern according to a plurality of data samples of the third signal and a transition sample of the third signal, comparing if the indicative pattern matches a predetermined pattern, and accordingly providing a comparison result, wherein the transition sample is sampled between two of the plurality of data samples;
   performing the pattern comparison step for a plurality of times to provide a plurality of corresponding comparison results;
   performing a voting step for proving a voting result according to majority voting of the plurality of comparison results;
   accumulating a plurality of voting results to provide an accumulation result; and
   performing a pre-tap tuning directing step for, according to the accumulation result, directing whether the pre-tap is incremented or decremented.

14. The method of claim 13, wherein the transmitter filter filters the first signal to provide the second signal further based on a post-tap, the receiver equalizer equalizes the second signal to provide the third signal based on an equalizer tap, and the method further comprises:

performing a post-tap tuning directing step for, according to a sign of the equalizer tap, directing whether the post-tap is incremented or decremented.

15. The method of claim 14, wherein the post-tap tuning directing step directs to increment the post-tap if the equalizer tap is greater than zero, and decrement the post-tap if the equalizer tap is less than zero.

16. The method of claim 13, wherein comparing the indicative pattern during the pattern comparison step is to compare if the indicative pattern matches one of a plurality of predetermined patterns.

17. The method of claim 13, wherein the pre-tap tuning directing step is performed for directing whether the pre-tap is incremented or decremented according to if the accumulation result is greater than a threshold.

* * * * *